United States Patent
Rork et al.

[11] 3,903,732
[45] Sept. 9, 1975

[54] VISCOSIMETER AND DENSITOMETER APPARATUS

[75] Inventors: Gerald D. Rork; Frank N. Simon, both of Bloomington, Minn.

[73] Assignee: Honeywell Inc., Minneapolis, Minn.

[22] Filed: June 17, 1974

[21] Appl. No.: 479,925

[52] U.S. Cl.................................. 73/54; 73/32 A
[51] Int. Cl.².................................. G01N 11/16
[58] Field of Search.................... 73/54, 59, 32 A

[56] References Cited
UNITED STATES PATENTS

| | | | |
|---|---|---|---|
| 2,340,992 | 2/1944 | Siegel | 73/59 |
| 2,707,391 | 5/1955 | McSkimin | 73/59 |
| 2,839,915 | 6/1958 | Roth et al. | 73/59 |
| 3,062,040 | 11/1962 | McKennell et al. | 73/59 |
| 3,603,137 | 9/1971 | Banks | 73/59 X |

FOREIGN PATENTS OR APPLICATIONS

| | | | |
|---|---|---|---|
| 830,463 | 3/1960 | United Kingdom | 73/59 |

*Primary Examiner*—Richard C. Queisser
*Assistant Examiner*—Joseph W. Roskos
*Attorney, Agent, or Firm*—Omund R. Dahle

[57] ABSTRACT

A viscosimeter and a densitometer are provided through use of a transducer or transducers to provide energy transductions and for providing vibratory energy. In this way, either shear wave energy or longitudinal wave energy or both can be imparted to the surrounding fluid. Indications from the transducer or transducers provide representations of either the fluid viscosity or the fluid density.

28 Claims, 3 Drawing Figures a — LENGTH
b — WIDTH
k — WAVENUMBER

PATENTED SEP 9 1975          3,903,732 a — LENGTH
b — WIDTH
k — WAVENUMBER a — EFFECTIVE RADIUS
k — WAVENUMBER

VISCOSIMETER AND DENSITOMETER APPARATUS

BACKGROUND OF THE INVENTION

This invention relates to viscosimeters and densitometers which provide a representation of the viscosity of adjacent fluid portions and a representation of the density of adjacent fluid portions, respectively, Particularly related are devices wherein a transducer is used to determine these representations by imparing shear waves and longitudinal waves to the adjacent fluid portions.

Various viscosimeters using members in motion to impart shear waves to fluids to determine the viscosity thereof have been devised heretofore. Among them is a viscosimeter in which a cup, suspended by wires, is driven in a rotational oscillation. The cup is filled with a fluid of interest for which the viscosity is to be determined. The fluid in the cup acts to damp the oscillation of the cup to provide an indication of the viscosity of the fluid. This viscosimeter requires rather an elaborate mechanical arrangement and typically uses an elaborate electrical arrangement utilizing a feedback loop from one suspension wire to the driver which loop includes amplification and other operations on the signals involved.

Another viscosimeter utilizes a pair of rectangular bars, one of the bars at least being of a piezoelectric material, with the fluid of interest located therebetween. The piezoelectric bar receives shear waves transmitted through the fluid by the other bar when this other bar is driven in reciprocating, oscillatory motion in its direction of elongation. The motion of the piezoelectric bar as a result of the shear waves impinging thereon is an indication of the viscosity of the fluid, this motion being converted into an electrical output by the transduction of energy from one form to another occurring in the piezoelectric bar. Again, a rather elaborate mechanical arrangement is required. A rather small output signal is obtained which usually must be amplified in the electrical output circuit for the signal to be satisfactorily used.

A viscosimeter which, in mechanical principles, is somewhat simpler than the foregoing viscosimeters is based on an electrically driven, torsionally vibrating, cylindrical piezoelectric crystal. These torsional vibrations impart primarily shear waves to those fluid portions adjacent to the crystal by use of a properly designed crystal. The effects of the fluid at the surface of the vibrating crystal provides a damping force on the crystal, i.e., the loading thereon. Therefore, as the viscosity changes and so the damping at the crystal's surface, the effective input impedance seen at the electrical driving terminals of the crystal also changes. This effective electrical input impedance can be analytically derived from an equivalent electrical circuit which includes in its generalized impedances the mechanical effects of both the torsionally vibrating crystal and the fluid. Viscosity can be determined through measuring the input impedance at the crystal resonance frequency with the crystal submerged in the fluid and comparing this measured impedance with another calibration measurement of the input impedance with the crystal submerged in a fluid of known parameters. This impedance measurement, however, is a rather inconvenient measurement.

A considerably more convenient viscosimeter which also uses the imparting of shear waves to adjacent portions of the fluid of interest has been described in a related co-pending application, Ser. No. 479,727 by Simon which is assigned to the present assignee and is hereby incorporated by reference herein. The viscosimeter described therein is based on a plurality of transductions of energy forms in a transducer such as a piezoelectric transformer. A signal provided in the sequence of transductions provides a representation of viscosity and measuring this signal allows avoiding the measurement of an impedance between the driving terminals of the transducer. In the sequence of transductions, surfaces of the transducer are placed in motion in directions in which they are capable of imparting shear waves to the adjacent fluid portions. Unavoidably, some longitudinal wave energy is also generated by the transducer in generating these shear waves. In both of the preceding viscosimeters, the one based on a torsionally vibrating, sylindrical piezoelectric crystal, and the viscosimeter of the related application based on a transducer with a plurality of transductions, the generation of longitudinal waves has been thought to be generally disadvantageous in that wave generation leads to errors in the impedance or in the signal, respectively, used to represent viscosity. However, the generation of longitudinal wave energy need not be detrimental to the use of the viscosimeter of the related application and, in fact, can be beneficial in a properly designed viscosimeter.

SUMMARY OF THE INVENTION

A sensor is provided in which a transducer therein provides an energy transduction from one form of energy to another and in doing so has surfaces of the transducer placed in motion in directions such that shear wave energy is imparted to those portions of the fluid of interest adjacent to these surfaces. The transducer also has surfaces placed in motion in directions such that longitudinal wave energy is imparted to those portions of the fluid of interest adjacent to these other surfaces, within a limited range of conditions for same purposes. This transducer has electrical input terminals to which oscillator circuitry means are attached whereby the circuit oscillation frequency is a resonant frequency associated with the moving surfaces when submerged in the fluid. This frequency can be determined by a value of the effective electrical impedance occurring between the electrical input terminals.

The transducer provides an output or outputs indicative of the viscosity of the adjacent portions of the fluid of interest and the density thereof and, selectively, the velocity of sound therein. The outputs may be used with a display and/or computation means or other output sensing means.

The transduction of energy forms may be one of a sequence such as to provide a voltage transformation between the electrical input terminals and electrical output terminals by use of a piezoelectric transformer as the transducer. Further, there may alternatively be two transducers one with surfaces providing primarily the shear wave energy to the fluid and the other with the surfaces providing primarily the longitudinal wave energy to the fluid.

DESCRIPTION OF THE PREFERRED EMBODIMENTS

Figure 3:
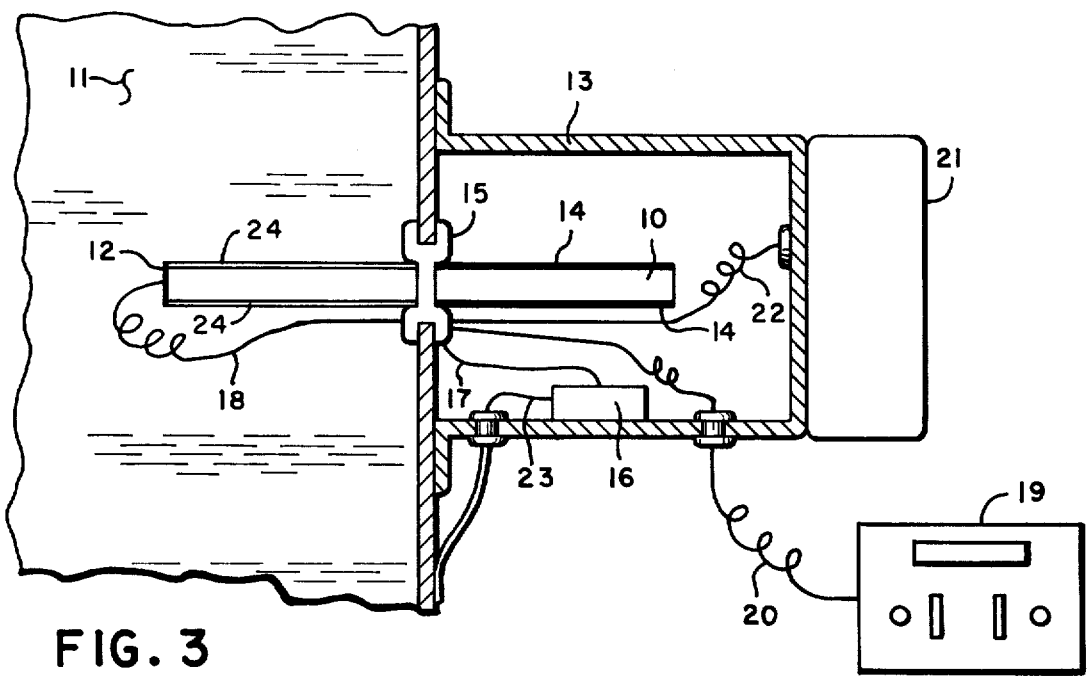
FIG. 3 shows an embodiment of the present invention.

Under a shear stress, all fluids exhibit a viscosity which is due to momentum transfer between various portions of the fluid. If the fluid was such that upon application of a shear stress there results a rate of change of shear strain which is a linear function of, i.e., proportional to, the applied shear stress, the fluid is termed a Newtonian fluid and the constant of proportionality is the Newtonian viscosity. Such a fluid behavior is characteristic typically of gases and many liquids, at least in a range of conditions.

However, many liquids exhibit more complicated behavior, as probably do all fluids in extreme conditions, with the rate of change of shear strain being a more complicated function of the applied shear stress. In these cases the function giving the dependence of the rate of change of shear strain on the applied stress will typically contain a term which is linear in the applied shear stress, representing the Newtonian portion of the behavior of the fluid and its Newtonian viscosity, and will also contain other terms which are more complicated functions of the applied shear stress which considered together can be used to define fluid viscosity. This fluid viscosity is the ratio of the rate of change of shear strain to the applied shear stress evaluated for the actual shear stress applied. As a result, fluid parameters other than Newtonian viscosity in these fluids will be important in determining the rate of change of shear strain as a function of applied shear stress, such as shear elasticity and the viscoelastic coefficient, parameters due to shear thickening and thinning, etc.

When a vibrating body is provided in a fluid, the vibratory motion of the body can generally apply both shear stresses and normal stresses to the fluid. The applied shear stresses, with the resulting rate of change of shear strain related thereto as indicated above, and the applied normal stresses lead to acoustic waves occurring in the fluid, both shear waves and longitudinal waves. The reactive force of the fluid on the vibrating body loads the body, damping its motions, with the result that the vibratory characteristics of the body are altered. This reactive force of the fluid must be equaled by the force in the stresses applied to the fluid by the vibrating body.

The fluid reactive shear force, being the shear stress of the fluid integrated over the surface area of the vibrating body, is related to the rate of change of shear strain by the fluid parameters discussed above relating shear stress and rate of change of shear strain. This relationship between the altered vibrating body characteristics, due to the shear reactive force of the fluid thereon, and the fluid parameters provides a basis for determining some of these fluid parameters through determining the changes in parameters describing the vibrating body, these changes being the result of altering the vibrating characteristics of the body due to loading it with a fluid.

The fluid reactive normal force on the vibrating body, being the normal stress of the fluid integrated over the surface area of the vibrating body, is also related to parameters of the fluid but these relationships differ from those describing the fluid reactive shear forces and fluid parameters. This normal reactive force, accordingly, alters the vibrating characteristics of the vibrating body in a given fluid differently than does the reactive shear force.

From one analytical point of view, the electrical effects in an electrically driven, vibrating body of both the fluid reactive shear force and of the fluid reactive normal force acting on this body can be described by an equivalent "electrical" circuit through the use of ideal transformers and the use of generalized impedances for the elements of the equivalent circuit. Generally, both resistive and reactive generalized impedance elements, serving as radiation impedances for both shear and longitudinal wave energy radiations, are found to be needed to represent the vibrating body in the fluid of interest. This indicates that power dissipation will occur, i.e., energy will be imparted to the fluid via the shear and longitudinal waves initiated therein by the vibrating body, and that a shift in resonant frequency will occur dependent upon the values required for these generalized impedance elements to represent adequately the vibrating body as submerged in a fluid.

The values of these generalized impedance elements will be functions of the fluid parameters since these impedances represent the vibrating body as it is subjected to the shear and normal reactive forces of the fluid thereon. From another view, the impedances represent the vibrating body structural parameters as modulated by the surrounding fluid to an extent determined by the parameters of the fluid which structural parameter modulation in turn modulates the acoustic vibratory energy in the crystal. The ideal transformers represent transductions in energy forms in the vibrating body, for instance from input electrical energy to acoustical vibratory energy. As these generalized impedances change in value with changing fluid parameters, the effective input impedance at the electrical input terminals changes accordingly.

In the viscosimeter of the related application referred to above, a piezoelectric transformer was used as the transducer and vibrating body. An equivalent "electrical" circuit of the piezoelectric transformer submerged in the fluid of interest would include two ideal transformers, one to represent the transduction of energy forms from electrical energy at the input terminals to acoustic vibratory energy and the other to represent the transduction from acoustic vibratory energy to the output voltage signal at the output terminals thereof. Along with these ideal transformers there would be included several generalized impedances including radiation impedances. These radiation impedances change in value with changing fluid parameters to change the value of the effective input impedance and the value of the output voltage signal.

The design of the piezoelectric transformer for this viscosimeter was concerned with, among other factors, minimizing the amount of longitudinal wave energy imparted to the fluid to prevent "errors" in the output voltage signal. These "errors" could come about because of the different relationships between the shear and normal reactive forces effective on the transformer of the fluid in which it is submerged and the parameters of this fluid. In the situation of negligible longitudinal wave energy being imparted to the fluid, the radiation impedances in the equivalent circuit for the piezoelectric transformer would depend on the fluid parameters in a manner reflecting only the manner in which the fluid reactive shear force depends on these parameters since only shear wave energy transfer to the fluid is significant.

Should the design of the piezoelectric transformer be altered in such a manner that longitudinal wave energy also becomes significantly imparted to the fluid surrounding the transformer, radiation impedances which are more complex functions of the fluid parameters, reflecting also the manner in which the fluid reactive normal force depends on the fluid parameters, would be needed in the equivalent circuit of the submerged transformer. This change in radiation impedances would provide a corresponding change in the output voltage signal and in the effective input impedance. From another point of view, the fluid reactive normal force would become sufficiently significant to alter the way the fluid modulated the structural parameters of the piezoelectric crystal and so how the acoustic vibratory energy therein was in turn modulated.

The radiation impedances in the equivalent "electrical" circuit can be described analytically as functions of both the mechanical impedance of the piezoelectric transformer and of the acoustic impedance faced by the surfaces of the transformer body. There will be both a shear acoustical impedance and a normal or longitudinal acoustical impedance if both shear wave energy and longitudinal wave energy are significantly imparted to the surrounding fluid. In the viscosimeter of the related application referred to above, where no significant longitudinal wave energy is imparted to the fluid, the normal or longitudinal acoustical impedance would not be a factor and only the shear acoustical impedance would appear. In this situation, for strictly Newtonian fluids, when the piezoelectric transformer is considered to be a rectangular bar so thin that no shear occurs in the piezoelectric material itself, when any longitudinal waves being generated are neglected, when the shear waves radiating therefrom encounter no foreign object and when a one dimensional analysis is made, the following relationship is found:

$$V_r - V = K_1 V \left(\frac{\nu\rho}{f_0}\right)^{1/2}$$

$\nu$ = fluid viscosity of fluid of interest
$\rho$ = fluid density of fluid of interest
$f_0$ = resonant frequency in fluid of interest
$V_r$ = output voltage amplitude in vacuum
$V$ = output voltage amplitude in fluid of interest
$K_1$ = calibration constant This relationship shows that the output voltage signal, or the difference between the output voltage signal and the voltage singla in the vacuum, is a function of the product of fluid viscosity and fluid density. Thus, for a variable fluid density, the density must be determined somehow if fluid viscosity is to be determined from the output voltage signal. The shift in resonant frequency of the piezoelectric transformer from the resonant frequency within a vacuum similarly depends upon the product of fluid viscosity and fluid density as follows:

$$f_{0r} - f_0 = K_2 (f_0 \nu \rho)^{1/2}$$

$\nu$ = fluid viscosity of fluid of interest
$\rho$ = fluid density of fluid of interest
$f_{0r}$ = resonant frequency in vacuum
$f_0$ = resonant frequency in fluid of interest
$K_2$ = calibration constant No meaningful simultaneous solution for viscosity and for density is possible from these two degenerate equations.

In general, the occurence of a significant amount of longitudinal wave energy being imparted to the surrounding fluid will change the behavior of the vibrating piezoelectric transformer and the above simple relationships, i.e., both the voltage amplitude relationship and the frequency shift relationship, will no longer hold and rather more complicated relationships occur. This complicates determining the fluid viscosity from measurement of the output voltage signal since generally more unknowns than equations occur in these resulting complicated relationships and, even if other fluid measurements are made to reduce the number of unknowns, these resulting equations may be so complicated as to make it impossible to determine the fluid viscosity therefrom.

However, the present invention includes finding that longitudinal wave energy can be imparted to the surrounding fluid in such a manner that, within a limited set of conditions, an output voltage signal amplitude relationship and a frequency shift relationship occur involving only the fluid viscosity and the fluid density as unknowns and, further, these two relationships are not degenerate so that they may be solved for both viscosity and density. Indeed, only the frequency shift relationship or the second of the above relationships is altered thus leaving the output voltage signal amplitude relationship unchanged. The result is that not only does the ability to determine the fluid viscosity from the output voltage signal amplitude remain just as above, but also the fluid density can be determined from measuring the resonant frequency shift in the voltage output signal.

Permitting the piezoelectric transformer, with an output signal described by the equations set out above, to be changed sufficiently to impart significant longitudinal wave energy to the surrounding fluid results in those surfaces of the transformer imparting such longitudinal wave energy facing a significant longitudinal acoustical impedance. This impedance appears as a factor in the radiation impedances used in the equivalent "electrical" circuit describing the transformer. The longitudinal acoustical impedance is complex, having both a resistive and a reactive portion therein.

In general, this longitudinal acoustical impedance will lead to, using the method of analysis used to reach the preceding equations and assuming the transformer shape is a rectangular bar, a relationship for the output voltage signal amplitude and a relationship for the frequency shift which relationships involve three unknowns, those unknowns being fluid viscosity, fluid density and the velocity of sound in the fluid. These two relationships could be solved for any two of the unknowns in terms of the remaining unknown but to obtain absolute values would require using another sensor to make another measurement to permit evaluation of three of these unknowns. A more complete analysis or a more general geometrical situation will lead to more complex relationships the solution of which can be quite complicated, perhaps requiring numerical analysis.

The preceding situation results when a general longitudical acoustic impedance is considered, but the longitudinal acoustic impedance has some special properties which are found to generally hold whatever the shape of the acoustically radiating body. Both the resistive and the reactive portions of the longitudinal impedance approach zero as the ratio of two parameters becomes small, one parameter being a dimension representing the extent of the surface imparting longitudinal wave energy to the fluid and the other parameter being the wavelength of the longitudinal wave energy. This ratio in approaching zero sufficiently closely represents the situation for the piezoelectric transformer in the related application referred to above where the longitudinal acoustic impedance is not a substantial factor in determining the effect of electrical impedance between the input terminals of the transformer.

However, the resistive portion and the reactive portion of the impedance approach zero at different rates of change with respect to the preceding ratio as this ratio becomes small, with the resistive portion approaching zero much more rapidly than does the reactive portion. This characteristic provides a range of values for this ratio in which the reactive portion of the longitudinal acoustic impedance is significant while the resistive portion is negligible. Hence, in this range no substantial amount of longitudinal waves occur in the fluid to carry energy away but instead energy is traded back and forth between the fluid and the surface driving the fluid. The longitudinal acoustic impedance has been calculated for several kinds of longitudinal wave energy radiating bodies and this relationship between the resistive portion and the reactive portion has been found to hold more or less generally.

Figure 1:
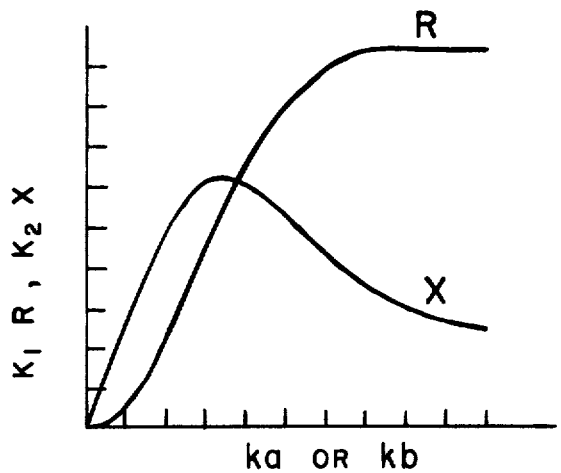
FIG. 1 shows a graph of the components of the longitudinal acoustic impedance faced by a rectangular piston set in a plane imparting longitudinal wave energy to adjacent fluid portions.
Figure 2:
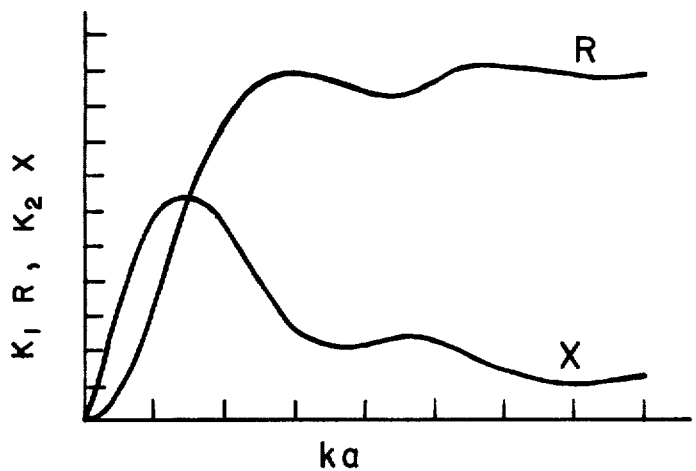
FIG. 2 shows a similar graph for a piston set in a sphere.

FIGS. 1 and 2 show examples of the results of these calculations for two substantially differently shaped radiating bodies. FIG. 1 shows graphs of curves which are proportional to the resistive and to the reactive components of the longitudinal acoustic impedance facing a rectangular piston having a flat face set in a plane. The curve related to the resistive portion is labeled with an R and the curve related to the reactive portion is labeled with an X. FIG. 2 shows a graph of the resistive portion, labeled R, and the reactive portion, labeled X, of the longitudinal acoustical impedance facing an acoustically radiating portion of a sphere, the portion determined by a plane intersecting with the sphere. The substantial geometrical difference between these acoustically radiating bodies and the settings they are in can be seen to have rather little effect on the relative relationship between the resistive and reactive components as the extent dimension/wavelength ratio becomes small.

An acoustically radiating body, then, can be designed so that the longitudinal wave energy imparting surfaces thereof have an extent dimension/wavelength ratio small enough so that the longitudinal acoustic impedance facing these surfaces is primarily reactive but not so small that the longitudinal acoustic impedance becomes a negligible factor. Providing a piezoelectric transformer in which the longitudinal wave energy imparting surfaces are designed accordingly results in the generalized radiation impedances of the equivalent electrical circuit representing the transformer submerged in the fluid being altered in such a manner that only the reactive portions thereof are substantially changed from the radiation impedances that would represent the transformer if it were designed to impart only negligible longitudinal wave energy.

As a consequence, the resonant frequency shift of the transformer submerged in a fluid would be a new function of fluid viscosity and fluid density as compared with the frequency shift relationship set out above if the same method of analysis was used since the resonant frequency depends on the reactive portion as well as the resistive portion of the generalized radiation impedances. On the other hand, the amplitude of the output voltage shift of the piezoelectric transformer as a function of fluid viscosity and fluid density would not change from the relationship set out above substantially since the output voltage difference, representing a dissipation, is related to only the resistive portion of the generalized radiation impedances. Hence, the output voltage signal of the transformer has two independent properties, each of which is related to the fluid viscosity and fluid density of the fluid surrounding the transformer by a different relationship. Solving these two relationships simultaneously allows determining both the fluid viscosity and the fluid density. This is generally the situation for a more complete analysis or for other geometrical arrangements.

Clearly, two piezoelectric transformers could alternatively be used as two different acoustically radiating bodies, one imparting primarily shear wave energy to the fluid and one imparting longitudinal wave energy to the fluid with the latter designed so the longitudinal acoustic impedance facing it would be primarily reactive. In this situation, there would be two separate output signals each having a property which was a different function of the fluid viscosity and the fluid density in which these two transformers were submerged.

FIG. 3 shows a piezoelectric transformer, 10, in the shape of a rectangular bar of piezoelectric material provided, in part, in a fluid, 11, The part or portion in the fluid 11 is the secondary portion of the transformer and has an output terminal, 12, located on the end thereof with an insulating layer, 24, thereon. The primary end of the transformer is located outside fluid 11 within protective cover 13. This end of the transformer has input driving terminals 14 located thereon which cover the entire lengthwidth faces of the transformer primary, the width dimension being perpendicular to the plane of the drawing, with the electrodes 14 separated by the thickness of the piezoelectric transformer. Piezoelectric transformer 10 is supported in a mount, 15. Driving electronics, 16, are connected to the input terminals 14 through mount 15 and an input cable, 17. The output terminal 12 supplies an output voltage signal through an output cable, 18, which, through mount 15, supplies the output voltage signal to a set of remote electronics, 19, via a distribution cable, 20, and to a set of local display electronics, 21, via a distribution cable, 22. The driving electronics 16 have power supplied thereto by a power input cable, 23.

The design of piezoelectric transformer 10 and its mounting arrangement results in the motion of the secondary portion, the only portion in the fluid when the transformer is in operation, being an oscillating, reciprocal motion along the length of the transformer 10. Both the top and bottom faces of piezoelectric transformer 10, the faces having a length and width dimension, therefore impart nearly only shear wave energy to fluid 11 as the transformer narrows with extension and widens with contraction in Piosson's ratio. The surface area of these surfaces imparting longitudinal wave energy to the fluid can be controlled by controlling the thickness dimension of the transformer 10. Thus the amount of longitudinal wave energy imparting surface can be controlled by an extent dimension, the transformer thickness, and so the longitudinal acoustic impedance facing these surfaces as a function of the ratio indicated above can be controlled. This is so since the frequency of operation of the transformer, its resonant frequency when submerged in fluid 11, is primarily controlled by the length dimension of the transformer.

For proper results, mount 15 should be a rigid mount and should be located at or near the node of vibratory motion of the piezoelectric transformer. Mounting the transformer in this method prevents the mount from affecting the damping force on the transformer too strongly.

The operation of the piezoelectric transformer, 10, is that of typical piezoelectric transformer operation. An oscillatory driving voltage is applied at input terminals 14 and a stepped-up output voltage appears at terminal 12 with respect to terminal 13. Electronics 16 contains an oscillator circuit to supply the driving voltage to input terminals 14 in a manner exciting the resonant frequency of the transformer when submerged. This can be accomplished by using the effective electrical impedance between the input terminals 14, which is purely resistive at the resonant frequency, as a functional impedance in the oscillator circuit to control the frequency of oscillation in the resulting circuit. A variable frequency wave generator may alternatively be used to supply the oscillating driving voltage to the input terminals 14 in a manner which excites a resonant frequency of the submerged transformer and leads to the amplitude of the output voltage signal being a maximum.

An analysis which assumes that a strictly Newtonian fluid surrounds the transformer, that the piezoelectric transformer is a rectangular bar so thin that no shear occurs within the piezoelectric material itself, that the surfaces indicated above to impart primarily longitudinal wave energy and those to impart primarily shear wave energy indeed impart to the fluid only those kinds of energy, and that a one dimensional analysis is sufficient, results in two relationships describing the output voltage signal for the piezoelectric transformer with a properly restricted parameter ratio. The first relationship is just the amplitude relationship set out above:

$$V_r - V = K_3 V \left(\frac{\nu\rho}{f_o}\right)^{1/2}$$

$\nu$ = fluid viscosity of fluid of interest
p = fluid density of fluid of interest
$f_0$ = resonant frequency in fluid of interest
$V_r$ = output voltage amplitude in vacuum
$V$ = output voltage amplitude in fluid of interest
$K_3$ = calibration constant The second relationship differs from the frequency shift relationship set out above and is as follows:

$$f_{or} - f_o = \frac{K_4(\nu\rho f_o)^{1/2} + K_5 \rho}{1 + \frac{K_6}{f_o}(\nu\rho f_o)^{1/2} + K_7 \frac{\rho}{f_o}}$$

$\nu$ = fluid viscosity of fluid of interest
p = fluid density of fluid of interest
$f_{or}$ = resonant frequency in vacuum
$f_0$ = resonant frequency in fluid of interest
$K_4, K_5, K_6, K_7$ = calibration constants The constants in the above equation can be determined through a calibration procedure. To determine the constants in the first equation ($K_3$ and $f_{or}$), the transformer must be operated in a vacuum and then in a fluid of a known fluid viscosity and fluid density or product thereof or, alternatively, the transformer must be operated in two different fluids having known fluid viscosity and fluid density or products thereof. In either situation, the output voltage signal amplitude and the oscillation frequency thereof must be measured in each medium. There being five constants to be determined in the second equation ($K_4, K_5, K_6, K_7$ and $f_{or}$) means that the piezoelectric transformer must be operated in a vacuum and in four different fluids of known parameters or, alternatively, it must be operated in five different fluids of known parameters to determine these constants. Again in either situation, the output voltage signal oscillation frequency must be measured. After these constants are determined, operating the piezoelectric transformer in an unknown fluid allows the determination of both the fluid viscosity and the fluid density of that fluid through simultaneous solution of the preceding two equations.

An output voltage signal from terminal 12 of piezoelectric transformer 10 can be transmitted to the computation/display electronics 19 to perform such calculations and to display the results. This is true also, of course, of local electronics 21. Alternatively, various other ways of data reduction can be used to provide fluid viscosity and fluid density from the output voltage signal appearing at terminal 12.

This sensor measures the point fluid viscosity of non-Newtonian fluids for the particular shear stress applied. The viscosity of the fluid can be provided as a function of the applied shear stress by varying the amplitude of the driving voltage applied to the input terminals 14 of piezoelectric transformer 10.

In practical application, where the fluid of interest has a substantial conductivity, the insulative layer 24 provided on the surface of the secondary of the piezoelectric transformer 10 becomes important. This insulative layer might be sputteredon quartz or possibly a thin plastic film.

The shear waves imparted to the fluid 11 by peizoelectric transformer 10 must be dissipated within the fluids entirely before encountering any objects foreign to the fluid for proper operation. This means no unwanted reflective surfaces belonging to foreign bodies should be near the transformer nor should any other uncharacteristic fluid discontinuities be allowed to occur. In most situations, there will be no difficulty in meeting these objectives, since for most fluids, the shear wave energy is dissipated in a few hundredths of a millimeter. The transformer should be located such that the longitudinal wave energy also does not encounter any foreign objects which should always be the case except for foreign objects very close to the transformer layer energy imparting surfaces. Where there is particulate matter mixed in with a fluid base to form fluid 11, the particulate matter can act to alter the fluid viscosity but will not cause significant scattering of the shear waves if the wavelength of these waves is quite long compared to the particulate matter dimensions, the usual situation.

The embodiments of the invention in which an exclusive property or right is claimed are defined as follows:

1. A sensor for providing representations of fluid parameters involving fluid viscosity, fluid density and fluid sonic velocity, said sensor comprising:
   an electrical transducer, having electrical terminals therein serving as input terminals, said transducer providing a transduction between energy types therein and said transducer, in effecting said transduction, has (a) first surfaces thereof placed in vibratory motion in directions in which they are capable of imparting shear wave energy to said fluid, and (b) second surfaces thereof placed in vibratory motion in directions in which they are capable of imparting longitudinal wave energy to said fluid; wherein said transduction is effective between said input terminals and electrical terminals serving as output terminals, said transduction plus at least one other providing a voltage transformation such that said output indication is an output voltage signal provided between said output terminals;
   oscillator circuitry means which provides an oscillating electrical signal at said input terminals; and
   output sensing means which senses an output indication to provide at least one of said representations.

2. The system of claim 1 wherein said voltage transformation is accomplished by use of a piezoelectric effect.

3. The system of claim 2 wherein said transducer has a piezoelectric transformer shaped as a rectangular bar.

4. The system of claim 3 wherein surfaces of said transformer which are submerged in said fluid in operation, excluding surface portions joined to said terminals, have an electrically insulating layer thereon.

5. A sensor for providing a representation of viscosity of a fluid and a representation of density of a fluid, said sensor comprising:
   an electrical transducer, having electrical terminals therein serving as input terminals, said transducer providing a transduction between energy types therein and said transducer, in effecting said transduction, has (a) first surfaces thereof placed in motion in directions in which they are capable of imparting shear wave energy to said fluid, and (b) second surfaces thereof placed in motion in directions in which they are capable of imparting longitudinal wave energy to said fluid, said second surfaces facing a longitudinal acoustic radiation impedance which is substantially purely reactive;
   oscillator circuitry means which provides an oscillating electrical signal at said input terminals; and
   output sensing means which senses an output indication to provide at least one of said representations.

6. The system of claim 5 wherein said transduction is effective between said input terminals and electrical terminals serving as output terminals, said transduction plus at least one other providing a voltage transformation such that said output indication is an output voltage signal provided between said output terminals.

7. The system in claim 6 wherein said voltage transformation is accomplished by use of a piezoelectric effect.

8. The system of claim 7 wherein said transducer is a piezoelectric transformer.

9. The system of claim 8 wherein said transformer is shaped as a rectangular bar and approximately half of said transducer, excluding surface portions joined to said input terminals, is submerged in said fluid in operation.

10. The system of claim 9 wherein said half submerged has an electrically insulating layer thereon.

11. The system of claim 5 wherein said oscillator circuitry means includes a variable frequency electrical wave generator operating in a manner which excites a resonance in said motions, said motions being vibratory.

12. The system of claim 5 wherein said oscillator circuitry means includes an oscillator circuit which has said transducer operating as a functional element therein in a manner which excites a resonance in said motions, said motions being vibratory.

13. The system of claim 5 wherein said output sensing means includes computation apparatus.

14. The system of claim 5 wherein there is a node in said motion of said surfaces, said motions being vibratory.

15. The system of claim 14 wherein a mount supporting said transducer is joined to said transducer substantially at said node.

16. A sensor for providing a representation of viscosity of a fluid and a representation of density of a fluid, said sensor comprising:
   an electrical transducer, having electrical terminals therein serving as input terminals, said transducer providing a transduction between energy types therein and said transducer, in effecting said transduction, has (a) first surfaces thereof placed in motion in directions in which they are capable of imparting shear wave energy to said fluid, and (b) second surfaces thereof placed in motion in directions in which they are capable of imparting longitudinal wave energy to said fluid, said second surfaces having a dimension representing the extent of the surface imparting longitudinal wave energy to the fluid;
   oscillator circuitry means which provides an oscillating electrical signal at said input terminals; and
   output sensing means which senses an output indication, said output indication having a first property thereof having a first relationship to said fluid viscosity and to said fluid density, said dimension representing an extent being of a value selected so as to provide a second relationship relating a second property of said output indication and said fluid viscosity and said fluid density, said second relationship differing in substance from said first relationship, with said value selected from among values over which said dimension does not substantially alter said first relationship.

17. The system of claim 16 wherein said transduction is effective between said input terminals and electrical terminals serving as output terminals, said transduction plus another providing a voltage transformation such that said output indication is an output voltage signal provided between said output terminals.

18. The system of claim 17 wherein said voltage transformation is accomplished by use of a piezoelectric effect.

19. The system of claim 18 wherein said transducer is a piezoelectric transformer.

20. The system of claim 19 wherein said transformer is shaped as a rectangular bar with said first surfaces including surfaces having a length dimension and a width dimension and said second surfaces including surfaces having a length dimension being said dimension representing an extent.

21. The system of claim 20 wherein approximately half of said transducer, excluding surface portions joined to said input terminals, is submerged in said fluid in operation.

22. System of claim 20 wherein said first property is an amplitude of said output voltage signal and said second property is a frequency of oscillation of said output voltage signal.

23. The system of claim 21 wherein said half submerged has an electrically insulating layer thereon.

24. The system of claim 16 wherein said oscillator circuitry means includes a variable frequency electrical wave generator operating in a manner which excites a resonance in said motions, said motions being vibratory.

25. The system of claim 16 wherein said oscillator circuitry means includes an oscillator circuit which has said transducer operating as a functional element therein in a manner which excites a resonance in said motions, said motions being vibratory.

26. The system of claim 16 wherein said output sensing means includes computation apparatus.

27. The system of claim 16 wherein there is a node in said motion of said surfaces, said motions being vibratory.

28. The system of claim 27 wherein a mount supporting said transducer is joined to said transducer substantially at said node.

* * * * *